United States Patent [19]
Andrews et al.

[11] Patent Number: 6,147,990
[45] Date of Patent: Nov. 14, 2000

[54] METHOD FOR PROVIDING COMMUNICATIONS NETWORK STABILITY

[75] Inventors: Daniel Matthew Andrews; Yihao Zhang, both of New Providence, N.J.

[73] Assignee: Lucent Technologies Inc., Murray Hill, N.J.

[21] Appl. No.: 09/083,011

[22] Filed: May 21, 1998

[51] Int. Cl.$^7$ .................................................. H04L 12/20
[52] U.S. Cl. ......................... 370/380; 370/369; 370/370
[58] Field of Search .................................... 370/389, 392, 370/400, 412, 418, 409, 380, 369, 370, 233

[56] References Cited

U.S. PATENT DOCUMENTS 5,132,966  7/1992  Hayano et al. ........................... 370/233

OTHER PUBLICATIONS

Borodin, Allan et al., "Adversarial Queueing Theory", In Proceedings of the 28th Annual ACM Symposium on Theory of Computing, Philadelphia, May 1996, pp. 376–385.

Andrews, Matthew et al., "Universal Stability Results For Greedy Contention–Resolution Protocols", 1996 IEEE, pp.380–389.

McKeown, Nick et al., "Achieving 100% Throughput in an Input–Queued Switch", in Proceedings of IEEEE INFO-COM, pp. 296–302, San Francisco, CA, Mar. 1996.

Karol, Mark J. et al., "Input Versus Output Queueing on a Space–Division Packet Switch", IEEE Transactions on Communications, vol. COM–35, No. 12 Dec. 1987, pp. 1347–1356.

Cruz, Rene L., "A Calculus for Network Delay, Part I: Network Elements in Isolation", IEEE Transactions on Information Theory, vol. 37, No. 1, Jan. 1991, pp. 114–131.

Cruz, Rene L., "A Calculas for Network Delay, Part II: Network Analysis", IEEE Transactions on Information Theory, vol. 37, No. 1, Jan. 1991, pp. 132–140.

McKeown, Nick et al., "Scheduling Cells in an Input–Queued Switch", Published in Electronics Letters, Dec. 9th, 1993, pp. 1–4.

*Primary Examiner*—Chi H. Pham
*Assistant Examiner*—Brenda H. Pham
*Attorney, Agent, or Firm*—Donald P. Dinella

[57] ABSTRACT

A packet routing technique which is stable for all networks in the presence of input blocking and output blocking. The packets injected within a network are examined and based on a historical perspective of those packets a determination is made on how to route individual packets throughout the network in a stable manner. In particular, in order to achieve complete network stability, individual switches within the network need to choose matchings, i.e., input to output port connections, that reflect the demand on each port-pair within the switches. Thus, if all packets are guaranteed to be in the network for at most a maximum number of time blocks, then a particular switch will have seen all the packets injected in the network at least that maximum number of blocks ago. Thus, a switch can choose port-pair combinations to facilitate the transmission of packets such that each packet currently in the network will reach its intended destination within the maximum number of blocks after its injection therefore providing network stability.

2 Claims, 2 Drawing Sheets

METHOD FOR PROVIDING COMMUNICATIONS NETWORK STABILITY

FIELD OF THE INVENTION

The present invention relates to communications networks and, more particularly, to a technique for routing packets in such communications networks.

BACKGROUND OF THE INVENTION

Of critical importance in the operation of communications networks is the speed at which information is exchanged through and between the communications networks. The information, e.g., data, is typically exchanged in modern-day communications networks through the routing of so-called packets. Thus, it is not surprising that one area in which a significant amount of effort has been directed is the study and modeling of communications networks from a packet routing perspective. For example, M. Andrews et al., "Universal Stability Results for Greedy Contention-Resolution Protocols", In *Proceedings of the 37th Annual Symposium on Foundations of Computer Science,* pp. 380–389, Burlington, Vt., October, 1996, is directed at the study of communications networks in which packets are generated at so-called "nodes" of the network and routed in discrete time steps across so-called "edges" of the network. One widely recognized critical issue in the modeling of such communications networks is the "stability" of the network. In the communications network arts, "network stability" is typically defined in terms of whether the number of packets in the network will remain bounded, as the network operates for an arbitrarily long period of time. That is, if the number of packets remains bounded over time the network is said to be stable.

Two related switching theory concepts which impact network stability are so-called "input blocking" and "output blocking". In short, input blocking is where a particular packet is blocked by another packet which requires the same input to a particular switch. That is, one packet's access to an input is "blocked" by a second packet. In contrast, output blocking is where a particular packet is blocked by another packet which requires the same output to a particular switch. Indeed, analyses of both input blocking and output blocking on a single switch is common in the switching theory arts. For example, M. J. Karol et al., "Input Versus Output Queueing on a Space-Division Packet Switch", In *IEEE Transactions on Communications,* 35(12):1347–1356, December, 1987, describes a queueing-theoretic approach to quantify the degradation in switch performance in the presence of input blocking. One recognized leading contributor to low switch utilization in this context is so-called head-of-line ("HOL") blocking. HOL is a situation in which a packet at the head of a first-in-first-out ("FIFO") queue used in the switch is output-blocked thereby blocking other packets in the FIFO queue. A number of techniques have been developed which are directed at reducing the effects of HOL thereby increasing individual switch utilization. For example, N. W. McKeown et al., "Achieving 100% Throughput in an Input-Queued Switch", In *Proceedings of IEEE INFOCOM,* pp. 296–302, San Francisco, Calif., March, 1996, describes an input-queued switch having a separate FIFO queue for each output at each input which facilitates an increased switch throughput thereby minimizing the HOL effects. Thus, the prior art is replete with various studies, models, techniques, and the like which examine the effect of input and output blocking in the context of switching theory but not in the context of network stability.

However, A. Borodin et al., "Adversarial Queueing Theory", In *Proceedings of the 28th Annual ACM Symposium on Theory of Computing,* pp. 376–385, Philadelphia, Pa., May, 1996, describes a so-called "adversarial injection model" for networks which can be applied in both the input and output blocking context. In accordance with this injection model, a so-called "adversary" injects packets into a network over some time interval. The adversary chooses the time at which packets are injected and the individual paths that the injected packets must follow as the packets traverse the network. Typically, the injection of packets by the adversary runs counter to providing network stability. Borodin et al., supra., and Andrews et al., supra., examine the adversarial model and its related effects from a mainly output blocking perspective. Further, in these studies and related protocols, situations are permitted for the routing of two packets that require the same input to a switch. Such a situation is not allowed in the context of a network which is subject to both input and output blocking, and where network stability is a critical issue.

However, the study of network stability in the presence of both input blocking and output blocking has not garnered a great deal of examination. In the past, the prevailing practice was to design switches so that input blocking does not occur. Further, in the past, switching speed was typically must faster than link speed so input blocking was not a major problem. As such, the examination of networks subject to both input and output blocking was not a major area for study. However, current communications switches have become much larger and switching speed is becoming more of a bottleneck and, therefore, can significantly impact the effective transmission of packets through an entire network in the presence of both input and output blocking. Therefore, a need exists for providing a communications technique which increases network stability in the presence of both input and output blocking.

SUMMARY OF THE INVENTION

The present invention provides a packet routing technique which is stable for all networks in the presence of both input blocking and output blocking. In accordance with one aspect of the invention, the packets injected within a network are examined and based on a historical perspective of those packets a determination is made on how to route individual packets throughout the network in a stable manner. In particular, in order to achieve complete network stability, individual switches within the network need to choose matchings, i.e., input to output port connections, that reflect the demand on each port-pair within the switches. Thus, we have realized that if all packets are guaranteed to be in the network for at most a maximum number of time blocks, then a particular switch will have seen all the packets injected in the network at least that maximum number of blocks ago. Thus, a switch can choose port-pair combinations to facilitate the transmission of packets such that each packet currently in the network will reach its intended destination within the maximum number of blocks after its injection therefore providing network stability.

In accordance with the preferred embodiment of the invention, time blocks are partitioned into blocks of L time steps where L is determined as a function of packet injections and network utilization. Having partitioned the time blocks, for each switch s in the network, a set of packets, $S_{ij}(t)$, is defined for each time block t which is a set of packets that switch has knowledge and are awaiting routing in the network. In accordance with the preferred embodiment of the invention, $S_{ij}(t)$ is defined as the set of packets which satisfy the following parameters: (i) the packet(s) require a port-pair (ij) of switch s; (ii) the packet(s) are injected during the time block t-c; and (iii) the packet(s) have arrived at switch s by the beginning of time block t. In accordance with the invention, the value of c, where c is the amount of time to traverse back in the overall packet history, is determined as a function of individual switch attributes and attributes of the current packets in the network. More particularly, in accordance with the preferred embodiment of the invention, the value of c is determined as a function of (i) the number of ports on a switch; (ii) the manner in which the packets are injected in the network; and (iii) a network utilization factor.

Having defined, for each switch s in the network, a set of packets, $S_{ij}(t)$, as described above, a determination is made of a maximum number, $R_{ij}(t)$, of packets which will be routed through each port-pair (ij) of each switch s during time t. Using the $R_{ij}(t)$ value (i.e., the maximum number of packets which will be routed through each port-pair (ij) of switch s during time t) that number of packets are selected from the set of packets presently awaiting routing through the switch for each port-pair (ij) of each switch s and thereafter routed through that switch thereby providing network stability.

In a further aspect of the invention, packets are routed in a stable network without requiring any prior knowledge of network attributes, e.g., the longest path in the network. More particularly, in accordance with this further aspect of the invention, time is again partitioned into blocks of length L. At the beginning of each block t, each switch s computes $R_{ij}(t)$ for each port-pair(ij). However, in accordance with this further aspect of the invention, the determination of $R_{ij}(t)$ is made without reference to any prior knowledge of network attributes. In particular, whenever a packet arrives, the switch s records the packet as "untagged". At the beginning of a block t, S represents the number of packets that have arrived at s and remain untagged. In accordance with this embodiment of the invention, the set of packets, $S_{ij}(t)$, used in the determination of $R_{ij}(t)$, is determined as follows: (i) let τ be the earliest block during which some packets in S are injected; and (ii) define $S_{ij}(t)$ as the subset of S containing all the (ij)-packets that are injected during block τ. As before, the $R_{ij}(t)$ value is then used for selecting that number of packets from the set of packets presently awaiting routing through the switch for each port-pair (ij) of each switch s and thereafter routed through that switch thereby providing network stability.

DETAILED DESCRIPTION

Figure 1:
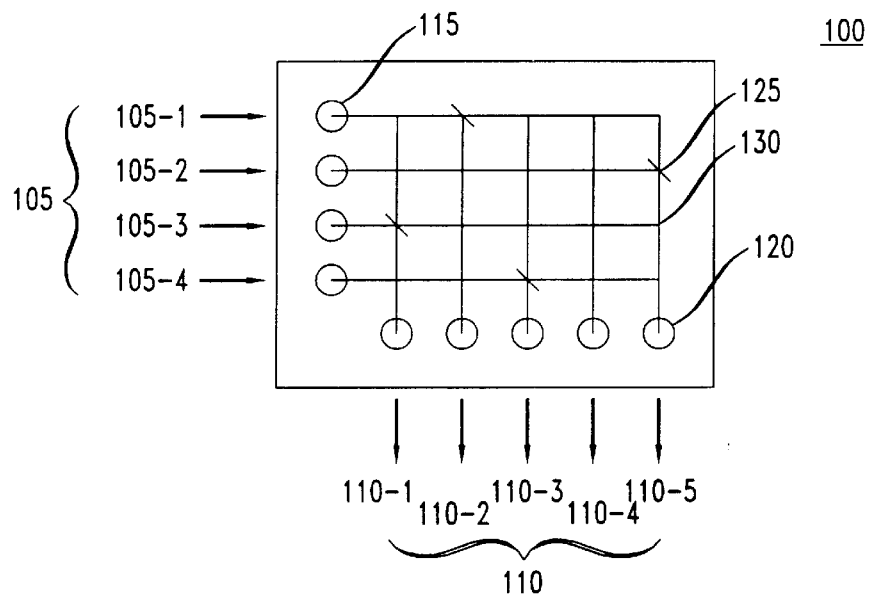
FIG. 1 shows a crossbar switch with connections between links and ports.

The present invention provides a packet routing technique which is stable for all networks in the presence of both input blocking and output blocking. In accordance with one aspect of the invention, the packets injected within a network are examined and based on a historical perspective of those packets a determination is made on how to route individual packets throughout the network in a stable manner. In particular, in order to achieve complete network stability, individual switches within the network need to choose matchings, i.e., input to output port connections, that reflect the demand on each port-pair within the switches. Thus, we have realized that if all packets are guaranteed to be in the network for at most a maximum number of time blocks, then a particular switch will have seen all the packets injected in the network at least that maximum number of blocks ago. Thus, a switch can choose port-pair combinations to facilitate the transmission of packets such that each packet currently in the network will reach its intended destination within the maximum number of blocks after its injection therefore providing network stability. In a further aspect of our invention, packets are routed in a stable network without requiring any prior knowledge of the network attributes.

It should be noted that for clarity of explanation, the illustrative embodiments described herein are presented as comprising individual functional blocks or combinations of functional blocks. The functions these blocks represent may be provided through the use of either shared or dedicated hardware, including, but not limited to, hardware capable of executing software. Illustrative embodiments may comprise digital signal processor ("DSP") hardware and/or software performing the operations discussed below. Further, in the claims hereof any element expressed as a means for performing a specified function is intended to encompass any way of performing that function, including, for example, a) a combination of circuit elements which performs that function; or b) software in any form (including, therefore, firmware, object code, microcode or the like) combined with appropriate circuitry for executing that software to perform the function. The invention defined by such claims resides in the fact that the functionalities provided by the various recited means are combined and brought together in the manner which the claims call for. Applicants thus regard any means which can provide those functionalities as equivalent as those shown herein.

Before describing the particular details of the invention, a brief discussion of network stability, input blocking, and output blocking is presented to provide context and to facilitate an understanding of the invention. In particular, a communications network is typically configured as a set of individual switches which are connected by a series of so-called links. Packets are injected into the communications network over time such that each packet traverses a sequence of switches and links as it is being transmitted to its ultimate destination. The transmission, i.e. movement, of packets within the communications network is typically restricted as a function of the limited resources (e.g., switches) of the network. As discussed above, network stability is typically defined in terms of whether the number of packets in the network will remain bounded, as the network operates for an arbitrarily long period of time. That is, if the number of packets remains bounded the network is said to be stable. Typical restrictions on packet movement (and, therefore, having a negative impact on network stability) are so-called link contention and switch contention.

As will be readily appreciated, a link is a connection between two switches. Link contention occurs due to the principle that only one packet at a time can cross any particular one link. Further restriction of packet movement can be attributed to switch contention which is where particular packets are contending for the switching resources within a particular switch. More particularly, FIG. 1 shows a crossbar switch 100 with connections between input links 105 (105-1 through 105-4, respectively) and output links 110 (110-1 through 110-5, respectively) where input links 105-1 through 105-4 are connected to output links 110-2, 110-5, 110-1 and 110-3, respectively. Further, each link is connected to a particular port. For example, input link 105-1 is connected to input port 115 and output link 110-5 is connected to output port 120.

Switch contention occurs due to the principle that only one packet at a time can be routed from any input port of a switch and only one packet can be routed to any output port of the switch. More particularly, as shown in FIG. 1, input links 105 and output links 110 are connected via a so-called crossbar architecture. As will be appreciated, the horizontal and vertical lines in FIG. 1 represent so-called "wires" of a switch and the so-called "crossings" are the places where the wires can be connected. That is, at each point in time certain crossings of the crossbar are closed, e.g., crossing 125 in FIG. 1, such that each input is connected at most to one output, and vice versa. Further, certain crossings are open, e.g., crossing 130 in FIG. 1.

Figure 2:
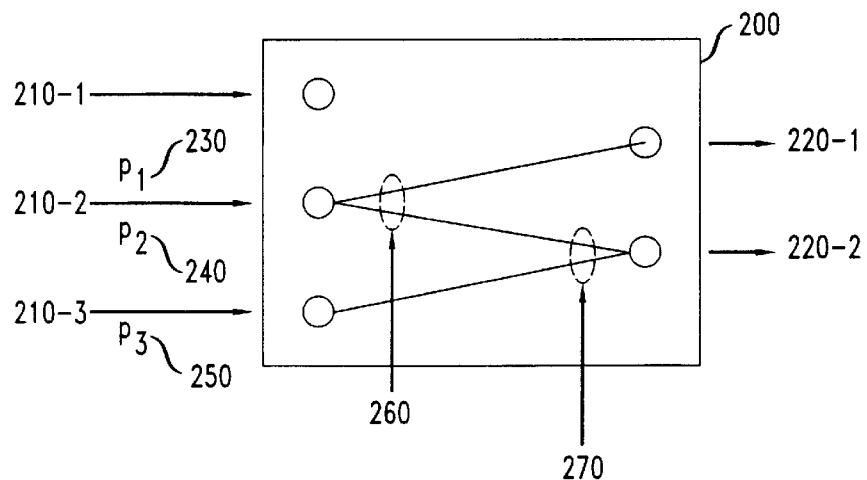
FIG. 2 shows an example switch configuration illustrating link contention, switch contention, input blocking, and output blocking.

FIG. 2 shows an example switch configuration 200 which further illustrates the concepts of link contention, switch contention, input blocking, and output blocking. In particular, switch 200 has three input links, 210-1, 210-2, and 210-3, respectively, and two output links, 220-1 and 220-1, respectively, for routing packets. For example, suppose packets $p_1$ 230 is waiting to be routed from input link 210-2 to output link 220-1, packet $p_2$ 240 is waiting to be routed from input link 210-2 to output link 220-2, and packet $p_3$ 250 is waiting to be routed from input link 210-3 to output link 220-2. Thereafter, at time $\tau$, packet 240 crosses switch 200 which therefore blocks both packet 230 and packet 250 from crossing switch 200 at time $\tau$. Thus, in such a scenario, packet 230 is said to suffer from input blocking and packet 250 suffers from output blocking. As shown, input blocking 260 occurs for packet 230 at input link 210-2, and output blocking 270 occurs for packet 250 at output link 230-2.

As discussed above, analyses of both input blocking and output blocking on a single switch is common in the switching theory arts (see, e.g., Karol et al., supra.), however, providing for the overall stability of an overall network in the presence of both input and output blocking is less understood by those skilled in the art. For example, consider a well-known stable protocol useful in an output blocking switch model such as the so-called Shortest-In-System ("SIS") protocol described, e.g., in M. Andrews et al., supra., p. 382. As will be appreciated by those skilled in the art, a so-called "stable" protocol is one that keeps the number of packets in the network bounded. However, closer examination of known stable protocols for output blocking, e.g., SIS, shows that such protocols are unstable in the presence of both input and output blocking from a overall network perspective. Thus, the transformation of a known stable output blocking network model to a stable input-output blocking network model is not straightforward.

Indeed, in accordance with our invention, we have realized a technique for the delivery of a stable network protocol in the presence of both input and output blocking as discussed in detail below. However, a brief examination of an attempt to extend a known stable output blocking switch model to a input-output blocking network model will now be discussed to further the understanding of our invention and the advantages thereof For example, we derived one possible illustrative extension of SIS in the context of an input-output blocking network model which is shown to be unstable. More particularly, in our illustrative SIS extension in the input-output blocking model one must recognize that packets which simultaneously cross a switch must define a so-called "matching". A matching between inputs and outputs is an assignment of inputs to outputs such that each input is connected to a most one output, and each output is connected to at most one input. That is, at any particular time step, at most one packet may be routed from any input and at most one packet may be routed to any output. Thus, the packets waiting at each switch are ordered with respect to the amount of time that the packets have been in the system, i.e., network. Each individual switch traverses their waiting packet list one-by-one such that the packet that has been in the system the shortest is chosen to cross the switch. For example, suppose packet p has requested port-pair (ij) of switch s and is recognized as being the next packet for transmission. That is, packet p is chosen to cross the switch if and only if no other packet that requires input port i has been chosen and no other packet that requires output port j has been chosen. This process, in our illustrative extension and examination of SIS in an input-output blocking network model, occurs at each switch in the network.

We can further modify SIS to define a protocol in which time is divided into individual blocks of length B. At the beginning of every block the above-described packet request process is undertaken but a particular packet p is chosen only if at most B–1 packets that require the same input port and output port have been chosen. As will be appreciated, for a single switch, if at most x packets require each input port and at most x packets require each output port, it follows that all such packets can be routed across the switch in x number of steps. Thus, all the packets chosen by a switch, where time is divided into individual blocks of length B, are able to advance during the next B number of blocks. However, as will now be shown this illustrative SIS extension is unstable for any block size that may be selected in the network context.

Figure 3:
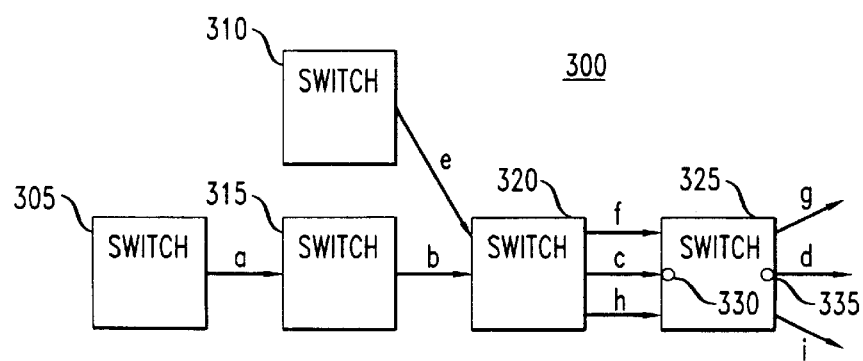
FIG. 3 shows an illustrative acyclic network arrangement for analyzing the effects of input and output blocking.

More particularly, FIG. 3 shows an illustrative acyclic network 300 arrangement for analyzing the effects of input and output blocking in the context of our modification and extension of the SIS protocol. As described above, this modification divides time into individual blocks of length B and the discussion below will address the instability of network 300 for any choice of block size where $B \geq 1$. As shown, acyclic network 300 consists of five switches 305–325, respectively, for routing packets. Packets are injected in acyclic network 300 along five paths (the paths are shown in FIG. 3 using the lower-case letter designations a–i): abcd, ecg, hd, efd and ci. These paths constitute a different combination of input and output ports across the network. Thus, packets which are injected along the paths ecg, hd, efd and ci, keep switch 325 busy at all times. Further, these packets block input port 330 and output port 335 during alternating blocks. As a result, the packets across path abcd are unable to cross switch 325 at any time due to input and output blocking effects.

We have realized a technique which is stable for all networks including those networks faced with both input and output blocking. In accordance with one aspect of our invention, the packets injected within a network are examined and based on a historical perspective of those packets a determination is made on how to route individual packets throughout the network in a stable manner. In accordance with a preferred embodiment of the invention, the injection of packets is determined in accordance with the so-called adversarial injection model as described previously and in more detail by A. Borodin et al., e.g., supra. at pp. 376–377. Thus, we have realized that if all injected packets are guaranteed to be in the network for at most c time blocks then a particular switch will have seen all the packets injected in the network at least c blocks ago. Given this fact, a switch can choose port-pair combinations to facilitate the transmission of packets such that each packet currently in the network will reach its intended destination within c blocks of its injection therefore providing network stability. Of course, in accordance with the invention, network stability is achieved in the context of the overall injection pattern of packets as determined by, e.g., the aforementioned adversarial injection model of the preferred embodiment.

Figure 4:
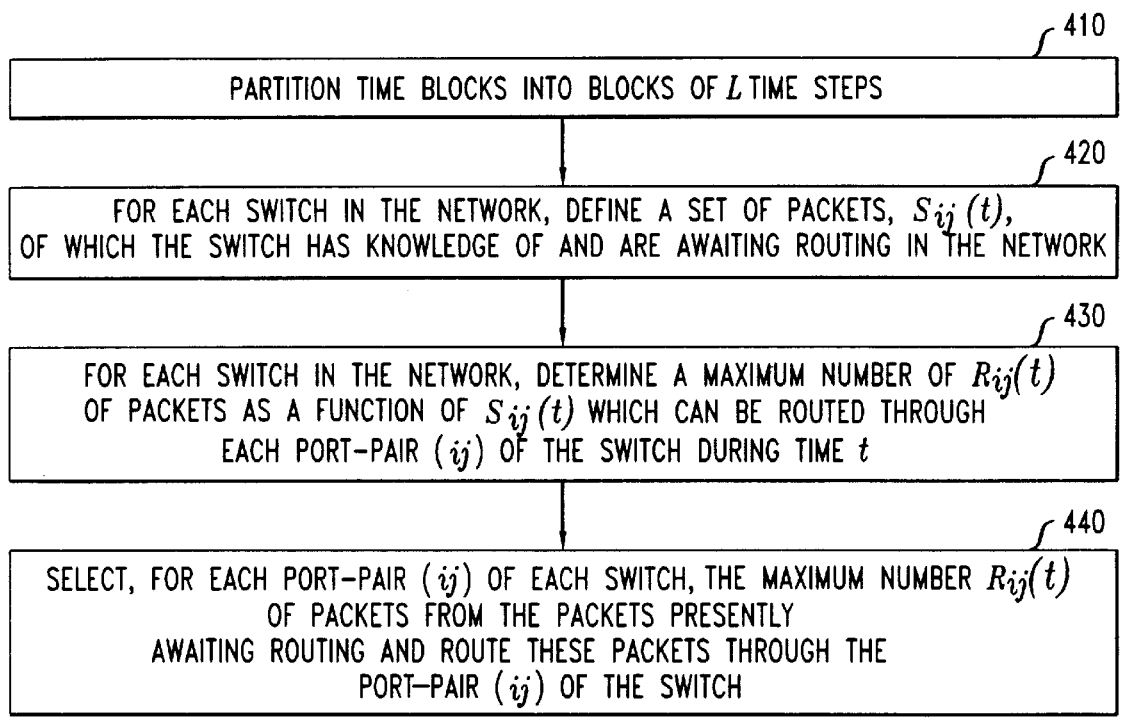
FIG. 4 shows a flowchart of illustrative operations for providing packet routing in accordance with the principles of the invention.

More particularly, FIG. 4 shows a flowchart of illustrative operations for providing packet routing, in accordance with the invention, in a network in the presence of both input and output blocking. In accordance with this illustrative embodiment of the invention, time blocks are partitioned into blocks of L time steps (block 410) where L is determined as a function of packet injections and network utilization. In particular, in accordance with the preferred embodiment of the invention, L is calculated as follows:

(1) $L = \lceil 2\sigma/\epsilon \rceil$, where $\sigma$ is the burst size of packet injections, and $\epsilon$ is a network utilization factor, e.g., 10%.

Having partitioned the time blocks, for each switch s in the network, a set of packets, $S_{ij}(t)$, is defined (block 420) for each time block t which is a set of packets that the switch has knowledge and are awaiting routing in the network. That is, a historical view of packets in the network, i.e., $S_{ij}(t)$, is employed to determine the future routing of packets to avoid input and output blocking. In accordance with the preferred embodiment of the invention, $S_{ij}(t)$ is defined as the set of packets which satisfy the following parameters: (i) the packet(s) require a port-pair (ij) of switch s; (ii) the packet(s) are injected during the time block t-c; and (iii) the packet(s) have arrived at switch s by the beginning of time block t. In accordance with the invention, the value of c, where c is the amount of time to traverse back in the overall packet history, is determined as a function of (i) the number of ports on a switch; (ii) the manner in which the packets are injected in the network; and (iii) a network utilization factor. More particularly, in accordance with the preferred embodiment of the invention c is calculated as follows:

(2) $c = 2(2\Delta/\epsilon)^{d-1}$, where d is the length of the longest path in the network for any single packet, and $\Delta$ is the maximum number of input ports or output ports of any switch in the network.

In determining c in accordance with equation (2) above, we necessarily define c to further satisfy the following condition: $t_d \leq t_1 + c - 1$, where $t_d$ is the time the packet exits the network, and $t_1$ is the time the packet enters the network. Thus, each packet is in the network for at most c blocks in accordance with the invention.

Having defined, for each switch s in the network, a set of packets, $S_{ij}(t)$, as described above, a determination is made of a maximum number, $R_{ij}(t)$, of packets (block 430) which will be routed through each port-pair (ij) of each switch s during time t. In accordance with the preferred embodiment of the invention, $R_{ij}(t)$ is determined as follows:

(3) $R_{ij}(t) = |S_{ij}(t)| + L\epsilon/(2\delta)$, where $\delta$ is the maximum number of input ports and output ports of switch s.

Using the $R_{ij}(t)$ value, i.e., the maximum number of packets which will be routed through each port-pair (ij) of switch s during time t, that number of packets are selected from the set of packets presently awaiting routing through the switch for each port-pair (ij) of each switch s and routed through the switch (block 440.) In accordance with the preferred embodiment of the invention, the $R_{ij}(t)$ number of packets selected are those which have been in the network for the longest period of time.

Advantageously, in accordance with the invention, packets are routed in a network in a stable manner without suffering the negative effects of input and/or output blocking. In particular, in accordance with the preferred embodiment of the invention, all packets chosen by a particular switch at the beginning of time block t can be routed across the switch during that time block without any deleterious impact from input and/or output blocking.

We will now further examine the network stability aspects of the invention in the context of a packet routing example. Illustratively, packet p is a packet injected during block $t_1$. Block $t_1$ is part of a sequence of blocks $t_k$ where the sequence is defined as follows:

$$\text{For } 2 \leq k \leq d, \text{ let, } t_k = t_1 + (c+1)\left(1 - \left(\frac{\varepsilon/(2\Delta)}{\varepsilon/(2\Delta) + 1 - \varepsilon/2}\right)^{k-1}\right), \quad (4)$$

where $\Delta$ is the maximum number of input ports or output ports of any switch in the network, and d is the maximum number of switches on any path chosen by the adversary. Thus, in accordance with equation (4) above, we can show that p arrives at its kth switch during block $t_k$ or earlier. That is, if all packets are routed in the network in accordance with the invention, then all the packets are in the network for at most c blocks so that p arrives at its kth switch during block $t_k$ or earlier.

More particularly, since p is injected during block $t_1$, it follows that p arrives at its first switch, i.e., the source switch, in the network during block $t_1$. Thereafter, p arrives at its (k-1) switch, i.e., the next switch, during block $t_{k-1}$. As will be shown further below, packet p crosses switch s and arrives at its kth switch during block $t_k$ or earlier. For example, suppose that p requires port-pair (ij) of s. Hereinafter, for simplicity and clarity of explanation, we refer to the packets in the network which require port-pair (ij) of s as the "(ij)-packets". An upper bound for the number of (ij)-packets which can block p can be determined by recognizing that each packet is in the network for at most c blocks. Thus, the packets injected during block $(t_{k-1}-c)$ or earlier are no longer in the network and therefore cannot block packet p at switch s. In this example, the upper bound of such injected packets is determined by examining blocks $(t_{k-1}-c+1)$ through $t_k-c$, and $(t_k-c+1)$ through $t_1$. Thus, in accordance with the preferred embodiment of the invention, all packets are in the system for at most c blocks so $S_{ij}(t)$ includes all the (ij)-packets that are injected during block t-c. Therefore, the total number of packets from blocks $(t_{k-1}-c+1)$ through $t_k-c$ that could potentially block packet p at switch s are determined by:

$$\sum_{t=t_{k-1}+1}^{t_k} |S_{ij}(t)|. \quad (5)$$

So, since at most $L(1-\epsilon/2)$ packets can be injected on any link during L steps, the total number of packets from block $(t_k-c+1)$ through $t_1$ that could block p at s is at most $(t_1-t_k+c)L(1-\epsilon/2)$. Thus, in accordance with the preferred embodiment of the invention, the number of (ij)-packets allowed to cross switch s is given by $R_{ij}(t)$. If fewer than $R_{ij}(t)$ packets with routing priority over p are waiting during a particular block t, then p crosses s during block t.

In the above discussion of the various aspects of the invention, the embodiments thereof utilize a historical perspective of the packets in the network to determine how to route individual packets throughout the network in a stable manner. That is, some apriori knowledge of the network and the packets in the network is effectively utilized by the switches for efficient routing decisions. Of course, in certain circumstances, such apriori knowledge may not be readily available at the switch. Thus, in a further aspect of our invention, packets are routed in a stable network without requiring such historical knowledge.

More particularly, in accordance with this further aspect of the invention, time is again partitioned into blocks of length L in accordance with equation (1) as previously discussed. At the beginning of each block t, each switch s computes $R_{ij}(t)$ for each port-pair (ij). However, in accordance with this aspect of the invention, the computation of $R_{ij}(t)$ is made without reference to a predetermined value of c as in the embodiments of the invention discussed above. In particular, whenever a packet arrives, the switch s records the packet as "untagged". As used herein, "untagged" refers to those packets which have not yet been designated as part of any $S_{ij}(t)$. At the beginning of a block t, S represents the number of packets that have arrived at s and which remain untagged. In accordance with this embodiment of the invention, the set of packets, $S_{ij}(t)$, used in the determination of $R_{ij}(t)$, is determined as follows: (i) let $\tau$ be the earliest block during which some packets in S are injected; and (ii) define $S_{ij}(t)$ as the subset of S containing all the (ij)-packets that are injected during block $\tau$. All the packets in $S_{ij}(t)$ are now recorded as "tagged" by the switch. As used herein, "tagged" refers to those packets which have been previously been designated as part of at least one $S_{ij}(t)$.

Using $S_{ij}(t)$, $R_{ij}(t)$ is now determined in accordance with equation (3), as previously described above. Further, in accordance with this further embodiment of the invention, once switch s has determined $R_{ij}(t)$ for each-port pair (ij), the switch chooses the number, i.e., $R_{ij}(t)$, of (ij)-packets that have been in the network the longest and routes those packets during block t.

The foregoing merely illustrates the principles of the present invention. Therefore, the invention in its broader aspects is not limited to the specific details shown and described herein. Those skilled in the art will be able to devise numerous arrangements which, although not explicitly shown or described herein, embody those principles and are within their spirit and scope.

We claim:

1. A method of routing a plurality of packets in a network, the network having a plurality of switches, the method comprising the steps of:

partitioning a plurality of time blocks L such that $L=\lceil 2\sigma/\epsilon \rceil$, where $\sigma$ is a burst size of packet injections, and $\epsilon$ is a utilization factor of the network;

calculating a routing factor c, the routing factor c calculated as $c=2(2\Delta/\epsilon)^{d-1}$, where d is the length of a longest path in the network for any particular one packet of the plurality of packets, $\epsilon$ is a utilization factor of the network, and $\Delta$ is a maximum number of input ports or output ports of any one switch in the plurality of switches in the network;

identifying a subset $S_{ij}(t)$ of the plurality of packets as a function of the routing factor c; and determining a maximum number $R_{ij}(t)$ of packets which will be routed through a particular switch in the network such that $R_{ij}(t)=|S_{ij}(t)|+L\epsilon/(2\delta)$, where $\delta$ is a maximum of number input ports and output ports of the particular switch.

2. The method of claim 1 further comprising the steps of:

selecting the maximum number of packets from the plurality of packets; and routing the selected packets through the particular switch.

* * * * *